United States Patent Office 3,567,609
Patented Mar. 2, 1971

3,567,609
PHOTOLYTIC PRODUCTION OF N-SUBSTITUTED N-NITROSOHYDROXYLAMINES
Martin Pape and Paul Raff, Ludwigshafen (Rhine), Germany, assignors to Badische Anilin- & Soda-Fabrik Aktiengesellschaft, Ludwigshafen (Rhine), Germany
No Drawing. Filed Oct. 20, 1967, Ser. No. 676,692
Claims priority, application Germany, Oct. 27, 1966, P 15 43 376.8
Int. Cl. B01j 1/10
U.S. Cl. 204—162    4 Claims

ABSTRACT OF THE DISCLOSURE

A process for the production of N-substituted N-nitrosohydroxylamines having the formula:

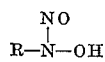

in which R denotes an alkyl, cycloalkyl or aralkyl radical, by reacting a hydrocarbon R—H (in which R has the said meaning) with NO and HCl in the presence of light at temperatures of from −100° C. to +100° C. at a pressure of up to 2 atmospheres absolute.

---

Salts of N-nitroso-N-organylhydroxylamines are used industrially as microbicides and as stabilizers for monomers. Hitherto they have been prepared by a complicated multistage method in extremely unsatisfactory yields. For example N-nitroso-N-cyclohexylhydroxylamine has been prepared from cyclohexane by nitration to nitrocyclohexane and subsequent reduction to cyclohexylhydroxylamine, followed by a nitrosation stage.

We have now found a considerably simpler method of production. The process according to our invention consists in reacting a compound having the formula R—H in which R denotes an alkyl radical having five to twenty carbon atoms, a cycloalkyl radical having five to twelve carbon atoms or a phenylalkyl radical having seven to twenty carbon atoms with nitric oxide and hydrogen chloride in the presence of light at temperatures of from −100° C. to +100° C. and at pressures of up to 2 atmospheres absolute.

According to a preferred embodiment of the process according to this invention, the reaction is carried out continuously by:

(a) Placing a hydrocarbon R—H and aqueous hydrochloric acid in a reactor which is irradiated with light having a wavelength range of from 250 to 600 millimicrons, introducing nitric oxide using mixing means which causes intense mixing of the reaction mixture, and recycling the unreacted nitric oxide to the reactor;

(b) Separating the layer of hydrocarbon R—H which contains not more than 2% by weight of N-substituted N-nitrosohydroxylamine from the layer of hydrochloric acid which is recycled to the reactor of stage (a);

(c) Extracting the layer of hydrocarbon with an aqueous alkali solution containing not more than 4% by weight of sodium hydroxide, potassium hydroxide or ammonia and recycling the extracted hydrocarbon (of which a portion may be purified by conventional methods, such as distillation or crystallization) to the reactor of stage (a); and (d) Isolating the reaction product as a salt by precipitation or preferably by spraying drying.

Practically no N-organylhydroxylamine is obtained as a byproduct in the new process. A high light efficiency is achieved. The product is obtained in high purity. The new process may be carried out at atmospheric pressure and therefore in simple apparatus. It is not necessary to use other substances, such as sensitizers, in addition to the hydrocarbon, nitric oxide and hydrogen chloride.

Examples of starting materials having the formula R—H (in which R denotes an alkyl radical which may be branched or linear) are pentane, hexane, octane, dodecane and octadecane. Cycloalkyl compounds, such as methylcyclopentane, dimethylcyclohexane, ethylcyclooctane and particularly cycloparaffins whose number of carbon atoms is equal to the number of ring atoms, such as cyclopentane, cyclooctane, cyclodecane, cyclododecane and preferably cyclohexane, may be used with special advantage. Examples of suitable arylaliphatic hydrocarbons are toluene, xylenes, ethylbenzene, cyclohexylbenzene and dodecylbenzene.

When using hydrocarbons whose hydrogen atoms are all equivalent so that when any one hydrogen atom is eliminated the same hydrocarbon radical always remains, uniform reaction products are naturally obtained. When the hydrogen atoms of the hydrocarbon used are not equivalent, the product is in general a mixture of isomeric compounds whose hydrocarbon radicals have the same empirical formula and which are derived from the hydrocarbon used by replacement of different hydrogen atoms. The distribution of the isomers is substantially determined by statistical laws and by the ease with which the various hydrogen atoms of the hydrocarbons can be replaced by radicals.

The hydrocarbons may also bear inert substituents, such as halogen, or one of the $CH_2$ groups may be replaced by oxygen (ether groups). Examples of suitable compounds are ethyl chloride, p-chlorotoluene, chlorocyclohexane, m-tolyl methyl ether and tetrahydrofuran.

The reaction is carried out in the presence of hydrogen chloride. The amount of hydrogen chloride is not critical but the concentration of hydrogen chloride in the hydrocarbon should preferably be more than 1% of the saturation concentration at atmospheric pressure. It is advantageous to choose a concentration between 0.01 and 0.1% by weight with reference to the hydrocarbon. To set up this concentration, hydrogen chloride gas may be used. It is particularly advantageous however to carry out the reaction in the presence of an aqueous solution of hydrogen chloride, with or without additional hydrogen chloride gas. The amount of aqueous hydrochloric acid, advantageously of 25 to 40% by weight strength, may also vary within wide limits. In general 1 to 25 parts by weight are used per 100 parts by weight of the hydrocarbon. The optimum amount of hydrogen chloride may easily be ascertained by experiment.

The reaction is usually carried out without any solvent. It is possible however (particularly when using solid starting materials) to use an inert solvent or diluent. Inert solvents are those which do not react or react only very slightly under the reaction conditions, for example carbon tetrachloride, carbon disulfide or benzene. When solvents are used, they are in general used in an amount which is 0.1 to 10 times the amount of hydrocarbon.

The new process is usually carried out without any catalyst. It is also possible however to use catalysts; particularly suitable catalysts are compounds which absorb light having a wavelength of from 250 to 600 millimicrons and under the action of this light have a dehydrogenating effect on CH bonds. ≡C+ radicals are formed intermediately. Catalysts which start only one chain of radicals and are thus used up as well as catalysts which are regenerated in the course of the reaction are suitable. In some cases the time up to initiation of the reaction can be shortened considerably by using catalysts. Examples of classes of compounds which are suitable as catalysts are carbonyl compounds which absorb light in the said wavelength range, such as acetophenone, benzophenone, acetone and diacetyl; organic peroxides and hydroperoxides, such as dibenzoyl peroxide and pinane hydroxyperoxide; or unstable organic azo compounds which easily decompose with the formation of radicals, such as azoisobutyrodinitrile. Nitrosyl chloride, chlorine, nitrogen dioxide, dinitrogen trioxide and organic nitroso compounds or dimers thereof, such as nitrosobenzene and bis-nitrosocyclohexane, are also suitable as catalysts.

Substances which cause the formation in the reaction mixture of compounds which absorb light in the wavelength range between 250 and 600 millimicrons may also be used as catalysts. For example when small amounts of oxygen are used, nitrosyl chloride is formed during irradiation with light and acts in turn as a catalyst.

The catalyst is used only in a small amount, in general 0.001 to 2% by weight, preferably 0.01 to 0.5% by weight, with reference to the reaction mixture. When benzophenone is used as catalyst, it is advantageous to use less than 0.8%, preferably less than 0.5%, by weight with reference to the reaction mixture. At higher concentrations, secondary reactions may take place which result in less good yields.

The reaction may be carried out within a wide temperature range. In general temperatures of from −100° C. to +100° C., preferably from −20° C. to +50° C., are used. The pressure range used is up to 2 atmospheres absolute, in general from 1 to 2 atmospheres absolute, preferably at atmospheric pressure. At pressures above 2 atmospheres absolute the difficulties to be overcome with the apparatus preclude economical operation; moreover the yields are less.

The reaction is carried out in the presence of light. A wide range of wavelengths is suitable. In general the range between 250 and 600 millimicrons, particularly between 300 and 600 millimicrons, is used. The sources of light may be any of the lamps commonly used for photochemical reactions, for example mercury-vapor lamps or xenon lamps. Sunlight is also suitable. Ionizing radiation, such as gamma rays, X-rays and beta-radiation, may also be used.

In carrying out the process, the hydrocarbon, which may contain a catalyst, is exposed to light in the presence of hydrogen chloride and nitric oxide is allowed to act thereon while mixing intimately. It is particularly advantageous to operate the process continuously by supplying hydrocarbon, hydrogen chloride and nitric oxide continuously to the irradiated reactor while at the same time of liquid reaction product is withdrawn through an overflow pipe and a small amount of offgas in which nitrogen formed as a byproduct accumulates is removed from the system through an air lock. Since nitric oxide has only slight solubility in the reaction mixture, intense mixing is always necessary so that the solution does not become impoverished in nitric oxide as the reaction proceeds.

It is advantageous to react the hydrocarbon only to a slight extent. The concentration of the N-nitrosohydroxylamine compound formed should in general not exceed 10% by weight, advantageously 1% by weight, because otherwise the relatively unstable compound tends to undergo decomposition under the reaction conditions.

Processing of the reaction mixture is carried out in the conventional way by physical and chemical methods of separation. It is advantageous to extract the reaction mixture or the organic phase of the mixture with alkalies, for example an aqueous solution containing not more than 4% by weight of sodium hydroxide, potassium hydroxide or ammonia. The salts of the N-substituted N-nitrosohydroxylamines are isolated from this aqueous alkaline solution, for example by spray drying.

According to another, less advantageous method of processing, the reaction mixture or the organic phase thereof is extracted for example with a 5 to 30% aqueous caustic soda solution. The reaction product is thus transferred as a salt into the aqueous phase and may be separated therefrom in crystalline form, if necessary after having been concentrated. Separation may also be effected by acidifying the aqueous solution, an extraction agent which is insoluble in water being advantageously used. The product may be separated particularly simply from the organic phase of the reaction mixture by adding amines or by passing in ammonia. A crystalline salt of N-nitroso-N-organylhydroxylamine is thus obtained direct which is insoluble in the organic phase.

The mixture which has been freed from the reaction product formed may be recycled to the reactor preferably after purification of a part thereof by conventional methods, such as distillation or crystallization.

The invention is illustrated in the following examples.

EXAMPLE 1

A mixture of 3 liters of cyclohexane and 0.5 liter of concentrated aqueous hydrochloric acid is exposed to light for two hours at 10° C. in a 4-liter stirred flask which is fitted with a laterally immersed water-cooled mercury-vapor lamp (Philips HPK 125 w), a condenser, stirring means, thermometer and a gas-feed frit, and at the same time nitric oxide is passed in at the rate of 10 liters per hour. The aqueous phase is separated after the light has been switched off. The organic phase is freed from dissolved nitric oxide by gassing with nitrogen and stirred with 200 ml. of 20% by weight aqueous caustic soda solution. 22 g. of N-nitroso-N-cyclohexylhydroxylamine sodium salt separates out and is removed. The product is very pure.

EXAMPLE 2

A mixture of 1000 g. of cyclododecane, 1500 g. of benzene and 500 ml. of concentrated aqueous hydrochloric acid is irradiated in a stirred vessel with a mercury-vapor lamp (Philips HPK 125 w). At the same time, nitric oxide is passed into the solution at a rate of about 10 liters per hour. After having been exposed, the aqueous phase is separated. (Upon concentrating this aqueous phase, only 0.3 g. of organic substances remain, which shows that practically no byproducts have been formed.) The organic phase is freed from dissolved nitric oxide by passing in nitrogen and stirred with 500 ml. of 2-normal caustic soda solution. 10.8 g. of colorless crystals separate out; by elementary analysis, infrared spectrum and conversion into derivatives they are shown to be the sodium salt of N-nitroso-N-cyclododecylhydroxylamine.

EXAMPLE 3

90 liters of cyclohexane and 5 liters of concentrated aqueous hydrochloric acid are intimately mixed in a reactor having an effective capacity of 100 liters. While exposing the mixture to radiation from an immersed water-cooled 2 kw. mercury high pressure vapor lamp it is gassed each hour with a mixture of 50 to 60 liters of nitrogen monoxide and 5 liters of hydrogen chloride. 15 liters per hour of reaction mixture is withdrawn through an overflow, the entrained aqueous hydrochloric acid is separated and the organic phase is extracted with 1.5 liters of a 10% aqueous caustic soda solution. The sodium salt of N-nitroso-N-cyclohexylhydroxylamine precipitated during the extraction is filtered off and the filtrate is separated in a separating vessel. The organic phase is replenished with cyclohexane and returned to the reactor, while the aqueous alkali phase is strengthened with fresh 50% caustic soda solution to 10% and used again for the extraction. The amount of aqueous concentrated hydrochloric acid in the reactor is kept constant by replacing the discharged aqueous phase (about 1 liter per hour) by fresh hydrochloric acid.

In continuous operation 47 kg. of the sodium salt of N-nitroso-N-cyclohexylhydroxylamine is recovered within 525 hours. In this period only small amounts of cyclohexanol nitrate and chlorocyclohexane have accumulated in the recycled reaction solution. There is no formation of N-cyclohexylhydroxylamine.

EXAMPLE 4

Photoreaction as described in Example 3 is carried out continuously. The amount of 15 liters per hour of reaction mixture withdrawn for processing is however (in contrast to Example 3) first scrubbed in a countercurrent column with 0.5 liter of water per hour and then in a second column with 1.5 liters per hour of 1.5% aqueous caustic soda solution. The aqueous solution of the sodium salt of N-nitroso-N-cyclohexylhydroxylamine thus obtained is evaporated to dryness in a spray tower. The extracted organic phase is separated and divided. 13 to 14 liters per hour is returned direct to the reactor, the remainder is freed from small amounts of high-boiling by-products, such as chlorocyclohexane and cyclohexanol nitrate, by distillation at atmospheric pressure prior to being recycled.

In a continuous experiment lasting 246 hours, 23 kg. of the sodium salt of N-nitroso-N-cyclohexylhydroxylamine is obtained in this way.

We claim:

1. A process for the production of N-substituted N-nitrosohydroxylamines having the formula

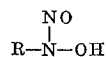

in which R denotes an alkyl radical having 5 to 20 carbon atoms, a cycloalkyl radical having 5 to 12 carbon atoms or a phenylalkyl radical having 7 to 20 carbon atoms, which comprises reacting a compound having the formula R—H in which R has the above meaning with nitric oxide and hydrogen chloride in the presence of light having a wavelength of from 250 to 600 millimicrons at a temperature of from —100° C. to +100° C. and a pressure ranging from atmospheric pressure up to 2 atmospheres absolute.

2. A process according to claim 1 which comprises reacting a compound having the formula R—H in which R has the meaning given in claim 1 with nitric oxide and hydrogen chloride which is present in an amount from 0.01 to 0.1% by weight with reference to the amount of the compound R—H at atmospheric pressure while irradiating the reaction mixture with light having a wavelength of from 250 to 600 millimicrons.

3. A process according to claim 1 wherein cyclohexane is used as the compound having the formula R—H.

4. A process according to claim 1 wherein the reaction is carried out continuously by combination of the following steps:
   (a) feeding into a reactor which is irradiated with light having a wavelength of from 250 to 600 millimicrons a hydrocarbon having the formula R—H in which R has the meaning specified in claim 1, aqueous hydrogen chloride and nitric oxide by means of a mixing device which brings the nitric oxide into intimate contact with the hydrocarbon and recycling the nitric oxide which has not been absorbed,
   (b) separating the hydrocarbon layer containing not more than 2% by weight of the N-substituted N-nitrosohydroxylamines from the hydrochloric acid layer,
   (c) extracting from the hydrocarbon layer the N-substituted N-nitrosohydroxylamines with an aqueous solution containing up to 4% by weight of sodium hydroxide, potassium hydroxide or ammonia, recycling the extracted hydrocarbon layer, a part of which may be purified, to the reactor of stage (a), and
   (d) isolating the reaction product as salt from the aqueous solution by precipitation or spray drying.

References Cited

UNITED STATES PATENTS

3,047,481  7/1962  Kahr _____ 204—162

FOREIGN PATENTS

788,436  1/1958  Great Britain _____ 204—162

BENJAMIN R. PADGETT, Primary Examiner